US009285595B2

(12) United States Patent
Moffatt et al.

(10) Patent No.: US 9,285,595 B2
(45) Date of Patent: Mar. 15, 2016

(54) MULTIPLE BEAM COMBINER FOR LASER PROCESSING APPARATUS

(71) Applicant: Applied Materials, Inc., Santa Clara, CA (US)

(72) Inventors: Stephen Moffatt, St. Brelade (JE); Douglas E. Holmgren, Portland, OR (US); Samuel C. Howells, Portland, OR (US); Edric Tong, Sunnyvale, CA (US); Bruce E. Adams, Portland, OR (US); Jiping Li, Palo Alto, CA (US); Aaron Muir Hunter, Santa Cruz, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1 day.

(21) Appl. No.: 14/594,890

(22) Filed: Jan. 12, 2015

(65) Prior Publication Data
US 2015/0124329 A1  May 7, 2015

Related U.S. Application Data

(63) Continuation of application No. 13/715,804, filed on Dec. 14, 2012, now Pat. No. 8,970,963.

(60) Provisional application No. 61/576,671, filed on Dec. 16, 2011.

(51) Int. Cl.
*G02B 27/12* (2006.01)
*G02B 27/10* (2006.01)
*G02B 27/14* (2006.01)
*G02B 17/08* (2006.01)

(52) U.S. Cl.
CPC .............. *G02B 27/10* (2013.01); *G02B 27/106* (2013.01); *G02B 27/12* (2013.01); *G02B 27/123* (2013.01); *G02B 27/126* (2013.01); *G02B 27/14* (2013.01); *G02B 27/143* (2013.01); *G02B 17/0888* (2013.01); *G02B 27/1006* (2013.01)

(58) Field of Classification Search
CPC ... G02B 27/1006; G02B 27/48; G02B 27/145
USPC ......................................................... 359/639
See application file for complete search history.

(56) References Cited

U.S. PATENT DOCUMENTS

| | | | |
|---|---|---|---|
| 3,942,127 A | 3/1976 | Fluhr et al. | |
| 3,968,362 A | 7/1976 | Mocker | |
| 5,295,143 A | 3/1994 | Rao et al. | |
| 2007/0291813 A1 | 12/2007 | Hu et al. | |
| 2011/0249240 A1* | 10/2011 | Takahashi et al. | 353/33 |

OTHER PUBLICATIONS

International Search Report and Written Opinion for International Application PCT/US2012/069518, mailed on Mar. 29, 2013.

* cited by examiner

*Primary Examiner* — James Jones
(74) *Attorney, Agent, or Firm* — Patterson & Sheridan, LLP

(57) ABSTRACT

Apparatus and methods for combining beams of amplified radiation are disclosed. A beam combiner has a collimating optic positioned to receive a plurality of coherent radiation beams at a constant angle of incidence with respect to an optical axis of the collimating optic. The respective angles of incidence may also be different in some embodiments. The collimating optic has an optical property that collimates the beams. The optical property may be refractive or reflective, or a combination thereof. A collecting optic may also be provided to direct the plurality of beams to the collimating optic. The beam combiner may be used in a thermal processing apparatus to combine more than two beams of coherent amplified radiation, such as lasers, into a single beam.

20 Claims, 2 Drawing Sheets

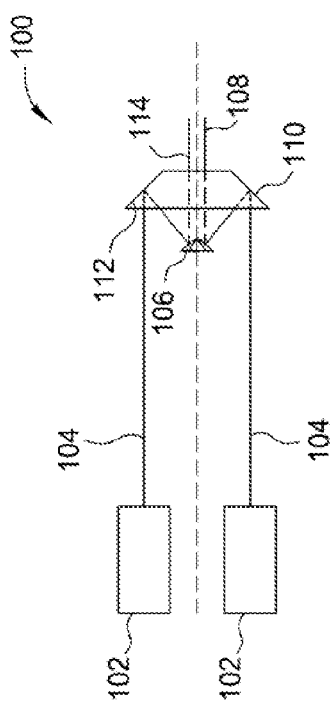
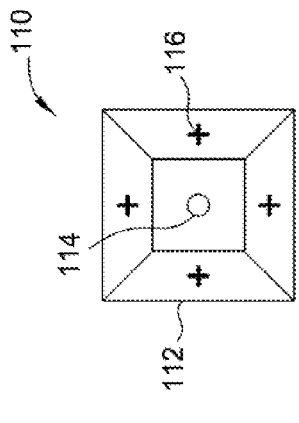
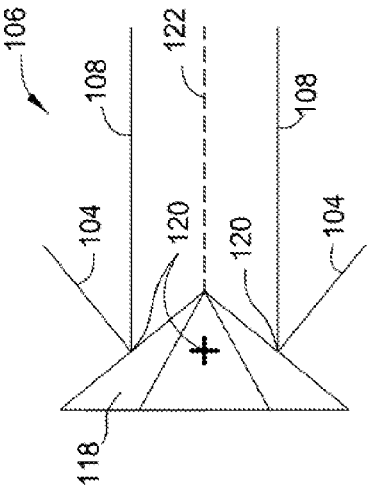
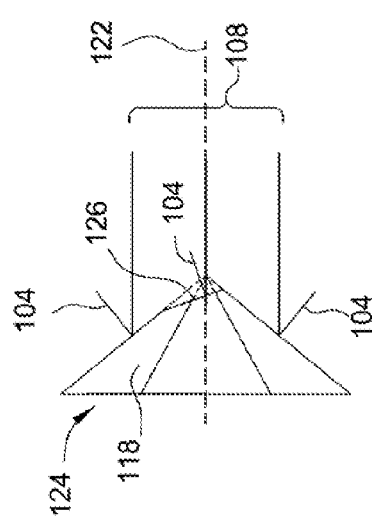

MULTIPLE BEAM COMBINER FOR LASER PROCESSING APPARATUS

CROSS-REFERENCE TO RELATED APPLICATIONS

This application is a continuation of co-pending U.S. patent application Ser. No. 13/715,804, filed Dec. 14, 2012, which claims benefit of U.S. Provisional Patent Application No. 61/576,671, filed Dec. 16, 2011, both of which are herein incorporated by reference in their entirety.

FIELD

Embodiments described herein relate to manufacture of semiconductor devices. More specifically, embodiments described herein relate to apparatus and methods for thermal processing.

BACKGROUND

Thermal processing is commonly practiced in the semiconductor industry. Semiconductor substrates are subjected to thermal processing in the context of many transformations, including doping, activation, and annealing of gate source, drain, and channel structures, siliciding, crystallization, oxidation, and the like. Over the years, techniques of thermal processing have progressed from simple furnace baking to various forms of increasingly rapid thermal processing such as RTP, spike annealing, and laser annealing.

Conventional laser annealing processes use laser emitters that may be semiconductor or solid state lasers with optics that focus, defocus, or variously image the laser light into a desired shape. A common approach is to image the laser light into a line or thin rectangle image. The laser light is scanned across a substrate (or the substrate moved beneath the laser light) to process the entire surface of the substrate.

As device geometry continues to decline, semiconductor manufacturing processes such as thermal processing are challenged to develop increased precision. In many instances, pulsed laser processes are being explored to reduce overall thermal budget and reduce depth and duration of energy exposure at the substrate. Challenges remain, however, in creating laser pulses having a temporal shape that affords the desired processing performance, with the uniformity needed for uniform processing across the surface of a substrate. Thus, there is a continuing need for new apparatus and methods for thermal processing of semiconductor substrates.

SUMMARY

Apparatus and methods for combining beams of amplified radiation are disclosed. A beam combiner has a collimating optic positioned to receive a plurality of coherent radiation beams at a constant angle of incidence with respect to an optical axis of the collimating optic. The respective angles of incidence may also be different in some embodiments. The collimating optic has an optical property that collimates the beams. The optical property may be refractive or reflective, or a combination thereof. A collecting optic may also be provided to direct the plurality of beams to the collimating optic. The beam combiner may be used in a thermal processing apparatus to combine more than two beams of coherent amplified radiation, such as lasers, into a single beam.

The collimating optic may be a faceted reflector that receives the plurality of beams at their respective angles of incidence and reflects the beams along a common optical axis. The beams may be reflected along paths that are in close proximity, such that the reflected beams form a combined beam. The collimating optic may be a refractive member that receives the plurality of beams and bends the beams along a common optical axis. The refractive member may bend the beams along paths that are in close proximity, that partially overlap, or that completely overlap to form a beam propagating along a single optical path.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a side view of a coherent radiation source according to one embodiment.

FIG. 1B is an axial view of the reflective side of the collecting optic of FIG. 1A, according to one embodiment.

FIG. 1C is a side view of the collimating optic of FIG. 1A.

FIG. 1D is a side view of a collimating optic according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2:
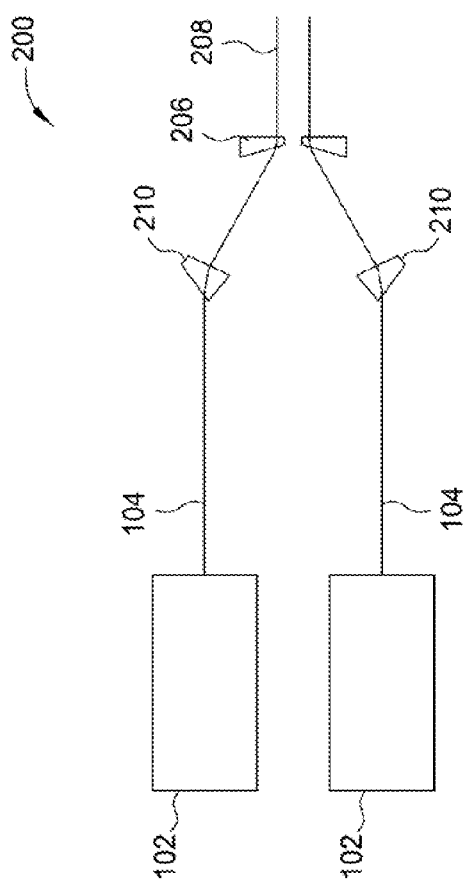
FIG. 2 is a side view of a coherent radiation source according to another embodiment.

FIG. 1A is a side view of a coherent radiation source 100 according to one embodiment. The coherent radiation source 100 may be a source of laser radiation or a source of non-resonant amplified coherent radiation. The coherent radiation source 100 has a plurality of coherent radiation emitters 102, each of which emits an incident beam 104 of coherent radiation. Each radiation emitter 102 may independently be a laser source or a non-resonant amplified coherent radiation source, such as a series of optical amplifiers. Each beam is directed toward a collimating optic 106 positioned to receive the plurality of coherent radiation beams 104 and output a substantially singular beam 108 of radiation constituting the combined coherent radiation beams from the plurality of emitters. The collimating optic 106 is a combining optic in some embodiments.

The collimating optic 106 may be a reflector, a refractor, or a combination of reflectors and refractors. In FIG. 1A, the collimating optic 106 is shown as a reflector, but FIG. 2 includes a collimating optic 206 that is a refractor, to be described in more detail below. The collimating optic 106 has a collimating optical property that corresponds to an angle of incidence of the coherent radiation beams 104 with respect to the collimating optic 106. For a refractor, the collimating optical property may be a refractive index that corresponds to the angle of incidence according to Snell's law, resulting in curvature of the incident beams into a single optical pathway upon exiting the collimating optic 106. For a reflector, the collimating optical property may also be a reflecting angle that reflects the incident coherent beams onto a substantially singular optical pathway. In the case of a reflective collimating optic, such as the collimating optic 106, the reflector may be a mirror, and may be curved or faceted. A faceted mirror may have a plurality of facets, as shown in FIG. 1A, each facet corresponding to one incident coherent radiation beam.

The incident coherent beams 104 may be directed to the collimating optic 106 by positioning the emitters 102 to point their emitted beams toward the collimating optic, or a collecting optic 110 may be used, as shown in FIG. 1A. The collecting optic 110 may also be reflective or refractive. In FIG. 1A, the collecting optic 110 is a reflector with one or more reflective surfaces 112 angled to reflect the incident beams 104 toward the collimating optic 106. The collecting optic 110 has an opening 114, through which the combined beam 108 may exit the apparatus 100, but the opening 114 is not required. For example, were the collimating optic 106 in FIG. 1A a refractor, the combined beam 108 would exit the apparatus travelling away from the collecting optic 110, so a central opening 114 would not be needed.

The central opening 114 may be any desired size and shape, and may be an aperture in some embodiments for shaping the combined beam 108. For example, if a rectangular beam cross-section is desired for the combined beam 108, the central opening 114 may have a rectangular shape. The central opening 114 may also be structured as an aperture to improve uniformity of energy distribution across the beam by truncating edge non-uniformities of the combined beam 108.

FIG. 1B is an axial view of the reflective side of the collecting optic 110, according to one embodiment. The collecting optic 110 of FIG. 1B is configured according to a generally square geometry to combine four incident coherent beams into a single combined beam. Four reflective surfaces 112 receive four incident coherent beams at target locations 116, and reflect them toward the collimating optic 106 of FIG. 1A (not shown in FIG. 1B). The collimating optic 106 reflects the beams 104 toward the central opening 114 of the collecting optic 110.

The collecting optic 110 is shown and described as a faceted reflector in FIGS. 1A and 1B, but in an alternate embodiment, the collecting optic 110 may be a continuously curved reflector, such as a curved mirror, for example a parabolic mirror. The collecting optic 110 may also be a collection of discrete reflectors, for example a plurality of mirrors, not connected into a single structure or object. In another embodiment, the collecting optic 110 may be an annular reflector or an annular mirror that has a faceted or curved surface.

It should be noted that any number of coherent beams 104 may be combined into the combined beam 108 using the apparatus 100. As shown in FIGS. 1A and 1B, the apparatus 100 provides optics to combine four optical paths into one optical path, but a greater or lesser number of optical surfaces may be provided to combine a greater or lesser number of beams. For example, the collecting optic 110 of FIG. 1B may be configured to collect five, six, seven, or any arbitrary number of beams by providing reflective or refractive loci, such as the target locations 116, for each incident beam. A curved collecting optic 110 is immediately adaptable for collecting any number of coherent beams.

The collecting optic 110 may be configured to perform any desired optical transformation of the incident coherent beams 104. If the incident coherent beams 104 are divergent, as with many diode lasers or laser diode arrays, the collecting optic 110 may collimate or focus each of the incident coherent beams 104 by providing appropriately curved reflecting surfaces at the target locations 116. The reflecting surfaces may also have dioptric power, if desired, to magnify or demagnify the incident coherent beams 104. For less divergent sources, such as solid state lasers, the reflecting surfaces are generally flat, or substantially flat, to maintain the linearity of the incident coherent beams. In general, the reflecting surfaces of the collecting optic may have optical power to correct or alter any property of the incident beams associated with direction of propagation, such as focus, magnification, distortion, and the like.

FIG. 1C is a side view of the collimating optic 106 of FIG. 1A. The collimating optic 106 has reflecting facets 118, each reflecting facet angled to receive a coherent radiation beam 104 at an incident angle and reflect the coherent radiation beam 104 along an optical pathway parallel to the optical axis 122 of the collimating optic 106 to form the combined beam 108. Each coherent beam 104 is thus reflected along a parallel pathway in close proximity to the other coherent beams 104, resulting in a combined beam 108 comprising a collection of sub-beams in close lateral proximity. If the incident coherent beams 104 are substantially single-mode beams, such as Gaussian beams, the combined beam 108 will resemble a single coherent beam having transverse modes of the type $TEM_{0n/2}$, where n is the number of incident coherent beams 104. If the incident coherent beams 104 are multi-mode beams, or a mixture of single-mode and multi-mode beams, the combined beam 108 will have a complex modality that does not resemble any classic analytical single-beam modality.

As with the collecting optic 110, the collimating optic 106 may have optical power to alter the incident beams in any desired way associated with direction of propagation. The collimating optic of FIG. 1C is shown having a pointed center, but the center may be flat or rounded, as desired. In the embodiment of FIG. 1C, the center of the collimating optic 106 is non-functional, so a different central shape will not alter function of the collimating optic 106. In other embodiments, the center of the collimating optic 106 may be functional.

A combined collecting optic 110 and collimating optic 106 may be configure to position the incident coherent beams 104 into any desired relationship as a combined beam 108 to produce a desired modality of the combined beam 108. The combined beam 108 produced by the optics of FIGS. 1A-1C will generally have a low or negligible central energy density because the incident coherent beams 104 are deployed in close proximity about the exit optical axis 122, with no beam occupying the center.

In an alternative embodiment, the collecting optic 110 and the collimating optic 106 may each be configured with a reflective surface 112/118 that deploys one of the incident coherent beams 104 into the center of the combined beam 108, propagating directly on the exit optical axis 122, to produce a combined beam 108 having an alternative modality. In such an embodiment, one reflecting surface or target location 116 of the collecting optic 110, if a collecting optic is used, is angled to direct an incident coherent beam 104 towards the center of the collimating optic 106, and one reflecting surface 118 of the collimating optic 106 is extended across the center of the collimating optic 106, and its angle adjusted to receive an incident coherent beam 104 at the center of the collimating optic 106, at a point along the central axis or exit optical axis 122 of the collimating optic 106, and reflect the beam along the exit optical axis 122.

FIG. 1D is a side view of a collimating optic 124 configured to combine incident coherent beams 104 into a combined beam 108 with an energy intensity maximum mode on the exit optical axis 122. Three incident coherent beams 104 are shown, two reflecting from the surfaces 118 that are the same as the reflecting surfaces of the collimating optic 106 of FIG. 1C, and one reflecting from an extended surface 126. The extended surface 126 encompasses the exit optical axis 122, corresponding to the central axis of the collimating optic 124, such that an incident coherent beam 104 may be directed to a target location on the exit optical axis 122. The extended surface 126 has an angle different from the other reflecting surfaces 118, the difference arising from the fact that the incident coherent beam 104 directed to the center of the collimating optic 124 arrives at a different angle of incidence from the other incident coherent beams 104. As with the reflecting surfaces 118, the extended surface 126 may have optical power to adjust properties of the coherent beam 104 incident upon the extended surface 126 in any way related to direction of propagation, such as focus, magnification, and/or distortion.

Any suitable reflector may be used for the collimating optic 106. Metallized surfaces, dielectric mirrors, Bragg mirrors, and partial mirrors may all be used.

FIG. 2 is a side view of a coherent radiation source 200 according to another embodiment. The coherent radiation source 200 is similar to the coherent radiation source 100 in many respects, with the key differences being that the collecting optic and the combining optic are refractive, rather than reflective. The combining optic 206 of FIG. 2 has an entry surface and an exit surface that together bend the incident coherent beams 104 into a combined beam 208 similar to the combined beam 108 of FIGS. 1A-1D. The combined beam 208 has component beams that are collimated in close proximity to propagate along a single optical axis. The combined beam 208 may be similar to a $TEM_{On/2}$ beam in cross-section, with a relatively dark center on the optical axis surrounded by lobes of energy maxima.

Incident coherent beams 104 are collected by a refractive collecting optic 210 that refracts the beams toward a refractive combining optic 206. Each of the refractive collecting optic 210 and the refractive combining optic 206 may be a unitary member or a plurality of members such as lenses or prisms. The refractive optics 206 and 210 may each be annular or quasi-annular, with a solid outer portion and a central opening, the perimeter and central opening of each member having any convenient shape, including circular, oval, square, triangular, polygonal, or irregular. As with the reflective optics of FIGS. 1A-1D, surfaces interacting with the incident beams 104 may be flat, curved, faceted, or any combination thereof. The central opening of each or either of the refractive optics 210 and 206 may be eliminated, if desired. In one embodiment, each of the refractive collecting optic 210 and the refractive combining optic 206 is a lens. In an embodiment wherein the refractive collecting optic 210 is a lens, the refractive collecting optic 210 may have a central opening, or the refractive collecting optic 210 may have a solid center without a central opening. It should be noted that projecting collimated light beams, such as laser beams, onto and through curved surfaces produces a convergent or divergent effect that may be corrected using corrective optics, if desired.

The collecting optic 210 may be omitted by pointing the emitters 102 directly towards the combining optic 206 at the desired incidence angle. It will be noted that, although only two emitters 102 are visible in FIG. 2, any number of emitters may be disposed in optical communication with the combining optic 206 to produce a combined beam 208. As described above, in the embodiment of FIG. 2, the combined beam 208 is a collection of component beams arranged to propagate in close proximity to a common optical axis, similar to a high modality coherent radiation beam emitted from a single emitter. In alternate embodiments using refractive optics, a component beam may be deployed on the optical axis, with other component beams surrounding and in close-propagating proximity. This may be achieved by directing an incident beam 104 through the central openings of each of the refractive collecting optic 210 and the refractive combining optic 206. In this way, a combined beam 208 may have a cross-sectional energy distribution that approximates a mixed beam of two component modalities, one component having a $TEM_{00}$ Gaussian modality and the other having a $TEM_{On/2}$ modality, where n is the number of non-axial incident coherent beams 104.

The incident coherent beams 104 may be arranged such that, as components of the combined beam 208, a cross-sectional edge of each component beam touches a cross-sectional edge of at least one other component beam. This may be accomplished by positioning the refractive combining optic 206 at a distance from the refractive collecting optic 210 such that the incident beams 104 converge to a partially overlapping relationship prior to entering the refractive combining optic 206. The refractive combining optic 206 may have one or more curved surfaces to accommodate and collimate the overlapping incident beams, so some non-linearity in the combined beam 208 may result. Edge non-uniformity of the combined beam 208 resulting from the non-linearity may ultimately be removed, if desired, using an aperture.

Figure 3:
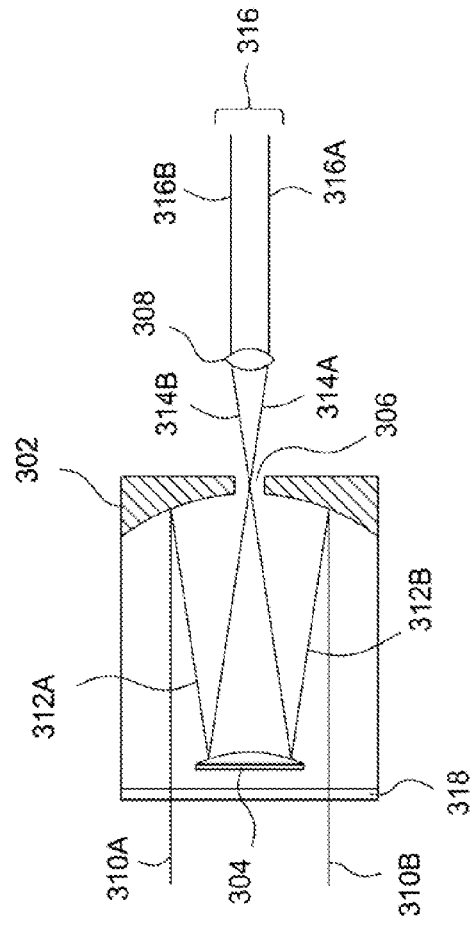
FIG. 3 is a side view of a coherent radiation source according to another embodiment.

FIG. 3 is a side view of a coherent radiation source 300 according to another embodiment. In the embodiment of FIG. 3, a first curved mirror 302 functions as a collecting optic, and a second curved mirror 304 functions as a combining optic. Incident coherent beams 310A and 310B are reflected from the first curved mirror 302, and reflected coherent beams 312A and 312B propagate toward the second curved mirror 304. The reflected coherent beams 312A and 312B are again reflected by the second curved mirror 304 and component beams 314A and 314B propagate through a central opening 306 in the first curved mirror 302. The component beams 314A and 314B are collimated by a collimating optic 308, which may be a lens, to form a combined beam 316 consisting of collimated component beams 316A and 316B. Distances and curvatures of the various optical elements may be adjusted according to well known formulas to provide a desired magnification or demagnification such that incident coherent beams 310A and 310B may be brought into combination in any desired relationship of the collimated component beams 316A and 316B. It should be noted that, although two incident coherent beams 310A and 310B are shown in the embodiment of FIG. 3, any number of incident coherent beams may be combined using the apparatus of FIG. 3.

A correcting plate 318 may also be deployed at an entry pupil of the coherent radiation source 300, or at any advantageous location along the optical path, to apply a desired adjustment to the combined beam 316 by refractively adjusting the incident coherent beams 310A and 310B. The correcting plate 318 may have refractive properties that compensate for any imperfection or inaccuracy in the first and second curved mirrors. The correcting plate 318 may also partially collimate the incident beams 310A and 310B such that the collimating optical element 308 may have a longer focal length and still collimate the emergent beams 316A and 316B in close proximity. A correcting plate or correcting optical element disposed between the second curved mirror 304 and the collimating optical element 308 may partially collimate or defocus the beams 310A and 310B before they reach the collimating optical element 308.

It will be noted that the collimating optical element 308 may be located any desired distance from the focal point of the second curved mirror 304, controlled by the focal length of the collimating optical element 308. Typically, the collimating optical element 308 is located such that a distance between the focal point of the second curved mirror 304 and the collimating optical element 308 is substantially equal to the focal length of the collimating optical element 308, so that radiation beams incident on the collimating optical element 308 exit in substantial parallelism. A short focal length element can be used to collimate the beams 316A and 316B in close proximity, depending on the optical properties of the other elements of the system.

The embodiments described in FIG. 1A-3 combine various reflective and refractive elements to form a beam combiner. As was noted above, reflective and refractive elements may be combined in a single embodiment. Moreover, in some embodiments, individual optical elements may combine reflective and refractive components. As an example, Bragg mirrors are reflective and refractive at the same time, but other examples are notable. The reflective collimating optic 106 of FIG. 1C may be a prism, and the reflective surfaces 118 may be Bragg mirrors or metalized surfaces. Such a prism may be given a transmissive core, if desired, by replacing the central point of the prism with a flat surface that is transmissive. One or more incident beams may then be directed through the central flat surface of the prism along the optical axis, while other incident beams are reflected from the facets 118 along the optical axis to produce a combined beam of reflected and refracted components.

All the embodiments described herein feature on axis combination of beams. That is, and optical axis or axis of symmetry of the incoming beams is substantially parallel to an optical axis of the outgoing combined beam or beams. Such orientation is not required, however. The outgoing beam or beams may be deflected to any desired axis using a reflective or refractive optic, such as a mirror. Additionally, multiple combiners may be staged, if desired, to form a first combined beam from a first plurality of beams and then combine a second plurality of beams with the first combined beam to form a second combined beam. As described above, a first combined beam may be propagated along an optical axis of a second beam combiner through a central opening thereof, using for example the beam combiner of FIG. 2, or the beam combiner of FIG. 3 with a small aperture formed through a center of the second curved mirror 304. The first combined beam would propagate through the second beam combiner, and beams combined by the second beam combiner would emerge in close proximity combined with the first combined beam. Any number beam combiners may be staged in this way.

Finally, it should be noted that any appropriate combination of the reflecting and refracting optics described herein may be used to combine multiple coherent beams into a single beam. Power losses typically encountered when using refractive optics may be overcome to some extent by use of anti-reflective coatings, but reflective optics are preferred for low-loss high power applications. Refractive optics, however, have the advantage that propagation of the light may be controlled using the refractive media. For example, a beam combiner using refractive optics may polarize one or more of the component beams, if desired. The beams may be spatially decorrelated by the beam combiner, if desired, by providing a diffusing exit surface of the beam combiner. For example, the exit surface of the combining optic 206 may be a diffusing surface to provide spatial decorrelation of the component beams in the combined beam 208.

Uniformity of the combined beams 108 and 208 may be improved by use of homogenizing optics, such as diffusers, lens arrays, mode scramblers, decorrelators, and the like. Examples of homogenizing optics that may be applied to a combined beam such as the beams 108 and 208 may be found in FIGS. 9, 10A, and 10B of U.S. Patent Publication 2009/0032511, and the text accompanying those figures.

Generally, any number of incident coherent beams may be combined into a substantially singular beam, which may be coherent to any degree, by directing the incident coherent beams to a combining optic that arranges the beams in a completely overlapping relationship such that the beams are co-located in space, a partially overlapping relationship, or a non-overlapping relation of close spatial proximity as to constitute a single co-propagating radiation beam. The combining optic may be reflective or refractive, and may combine reflective and refractive components. In addition the examples shown above in connection with FIGS. 1A-2, a collimating optic may combine one or more refractive components coupled to a reflective component to achieve a desired change in the direction of propagation of each beam and/or adjust other optical properties of the combined beam. For example, different polarizations may be imparted to the individual incident beams using localized refractive optics at different target locations of the combining optic to produce a combined beam having complex polarization modes (i.e. polarization along a particular axis whose value varies across the beam cross-section). In the example of the collimating optic 106 of FIGS. 1C and 1D, a polarizing film may be applied to each of the reflective surfaces 118 and 126 that imparts a different axis of polarization to each respective incident coherent beam 104 such that the combined beam 108 has different polarization values at different locations in the cross-section of the combined beam 108.

An additional capability of the methods and apparatus described herein is to combine incident coherent beams of different wavelengths into a single polychromatic combined beam. In such an embodiment, a number of lasers emitting at different wavelengths may be combined into one "white light laser" producing a high power linear beam of concentrated radiant energy that is not monochromatic, or even narrow-spectrum. Such a beam may have a much broader spectrum than any natural amplifier can emit on its own.

While the foregoing is directed to embodiments of the invention, other and further embodiments of the invention may be devised without departing from the basic scope thereof.

What is claimed is:

1. A beam combiner for combining a plurality of coherent beams into a single beam, comprising:
   a plurality of coherent radiation sources;
   a collimating optic positioned to receive a plurality of coherent beams from the plurality of coherent radiation sources, each coherent beam being received at the same angle of incidence with respect to an optical axis of the collimating optic;
   a collecting optic positioned to direct the plurality of coherent beams to the collimating optic; and
   a mode scrambler.

2. The beam combiner of claim 1, wherein the collimating optic has a refractive index that corresponds to the angle of incidence in a collimating relation.

3. The beam combiner of claim 1, wherein the collimating optic has a reflecting angle that corresponds to the angle of incidence in a collimating relation.

4. The beam combiner of claim 1, wherein the collimating optic is a lens.

5. The beam combiner of claim 1, wherein the collimating optic is a mirror.

6. The beam combiner of claim 4, wherein the lens comprises a material with a refractive index that corresponds to the angle of incidence in a collimating relation.

7. The beam combiner of claim 5, wherein the mirror has a reflecting angle that corresponds to the angle of incidence in a collimating relation.

8. The beam combiner of claim 7, wherein the mirror is a curved mirror.

9. The beam combiner of claim 7, wherein the mirror is a faceted mirror.

10. The beam combiner of claim 9, wherein the mirror has one facet for each coherent beam, and each facet has a reflecting angle that corresponds to the incidence angle of the corresponding coherent radiation beam.

11. The beam combiner of claim 9, further comprising a focusing optic.

12. The beam combiner of claim 1, wherein at least two of the coherent radiation sources emit radiation having different wavelengths.

13. The beam combiner of claim 1, wherein the collecting optic is an annular reflector.

14. A radiation source, comprising:
a beam combiner comprising a collecting optic, a collimating optic, and a correcting optic, wherein the collecting optic is an annular reflector, and the correcting optic reduces distortions of the combined radiation beam;
more than two coherent radiation emitters, each coherent radiation emitter disposed to emit a radiation beam toward the beam combiner disposed to receive the radiation beams and emit a combined radiation beam, wherein each beam is received at the same angle of incidence with respect to an optical axis of the collimating optic; and
a mode scrambler.

15. The radiation source of claim 14, wherein the collimating optic comprises a mirror.

16. The radiation source of claim 14, wherein the collimating optic comprises a lens.

17. The radiation source of claim 14, wherein the collecting optic comprises a mirror, the collimating optic comprises a lens, and the correcting optic comprises a mode scrambler.

18. The radiation source of claim 14, wherein the collecting optic and the collimating optic each are configured with a reflective surface.

19. A radiation source, comprising:
a beam combiner for combining a plurality of coherent beams into a single beam, the beam combiner comprising:
a combined collecting optic and collimating optic, wherein the collimating optic has a collimating optical property; and
a correcting optic;
more than two coherent radiation emitters, each radiation emitter disposed to emit a radiation beam toward the beam combiner disposed to receive the radiation beams and emit a combined radiation beam.

20. The radiation source of claim 19, wherein at least two of the coherent radiation emitters emit radiation having different wavelengths.

* * * * *